United States Patent [19]

O'Cheskey

[11] 4,053,408
[45] Oct. 11, 1977

[54] METHOD OF UPFLOW LIQUID TREATMENT

[75] Inventor: Theodore H. O'Cheskey, Whittier, Calif.

[73] Assignee: U.S. Filter Corporation, Whittier, Calif.

[21] Appl. No.: 466,289

[22] Filed: May 2, 1974

[51] Int. Cl.² ............................................. B01D 25/06
[52] U.S. Cl. .............................. 210/79; 210/DIG. 18
[58] Field of Search .................... 210/41, 77, 79, 80, 210/274, 276, 388, 220, 285, 286, 407, 408, DIG. 18

[56] References Cited

U.S. PATENT DOCUMENTS

| 2,453,345 | 11/1948 | Row et al. | 210/288 X |
| 2,758,070 | 8/1956 | Yurko | 210/41 |
| 2,788,859 | 4/1957 | Eron | 210/DIG. 18 |
| 2,874,848 | 2/1959 | Cannon et al. | 210/388 X |
| 2,902,160 | 9/1959 | Anderson | 210/388 |
| 3,463,727 | 8/1969 | Lakey | 210/77 |
| 3,557,955 | 1/1971 | Hirs | 210/280 |
| 3,618,888 | 10/1971 | Harris | 210/80 |

Primary Examiner—Theodore A. Granger
Attorney, Agent, or Firm—Christie, Parker & Hale

[57] ABSTRACT

An upflow liquid treatment method is provided with a vibrator which is used to facilitate the settling of granular solids down through a grate used to hold the solids in a static condition during the treatment cycle when liquid to be treated is passed upwardly through the bed.

3 Claims, 2 Drawing Figures

METHOD OF UPFLOW LIQUID TREATMENT

BACKGROUND OF THE INVENTION

1. Field of the Invention

This invention relates to liquid treatment method, and more particularly is directed to improvements in upflow ion exchange and filtering apparatus filters, i.e., apparatus in which a liquid to be treated is passed upwardly through a filter bed of granular solids.

2. Description of the Prior Art

Upflow filters and ion exchange equipment have been in use for a number of years. Examples of such units are shown in U.S. Pat. No. 1,891,061, issued 1932; U.S. Pat. No. 2,855,364, issued 1958; and U.S. Pat. No. 3,202,286, issued 1965. It has long been known that filtering or treating liquid which is to be passed through a bed of granular solids is more efficient if the liquid is flowed upwardly through the bed instead of downwardly, because the solids are automatically distributed with the coarser ones at the bottom and the smaller ones at the top of the bed. However, upward flow involves the problem of the bed lifting, cracking, or fluidizing, with the result that the liquid passes freely through the bed without undergoing the filtering or treating action intended by the granular solids. The disruption of the bed is particularly a problem when it is desired to flow the liquid through the bed at a relatively high rate. This problem has been partially solved by the use of a grate in contact with the upper portion of the bed to prevent it from rising or becoming fluidized under relatively high throughput rates. Typical examples of grates are shown in U.S. Pats. Nos. 2,855,364 and 3,202,286 referred to above.

However, even with a grate, the bed eventually becomes so loaded with trapped material that it must be cleaned. This is typically done by increasing the flow of liquid through the bed, and sometimes by also adding air, to cause the bed to break up and permit the trapped material to be released and flushed out as liquid flows up through the fluidized bed. After the granular solids are cleaned of trapped material, the flow of liquid up through the filter is reduced or stopped, and the granular solids are permitted to settle back into a static bed. The settling results in a natural classification of the granular solids, with the larger, heavier solids settling to the bottom of the filter bed, and the lighter or smaller particles progressively coming to rest at higher elevations in the bed. This provides an effective use of the bed, especially when particulate material of different sizes is to be removed from liquid undergoing filtration. The coarser solids at the bottom of the bed take out the larger particulate material so that it does not reach the zones of the bed where the finer particles are more densely packed, leaving these upper sections of the bed to do a more effective job on the smaller particulate material which flows past the coarser solids in the bed.

Although the grate referred to above extends the treatment cycle by restraining the bed in a static condition as the pressure drop across the bed increases, the grate presents a problem at the end of the washing cycle when the granular solids start to settle back to their static position. Depending on the specific gravity of the granular solids and the liquid being treated, as well as the viscosity of the liquid, the granular solids sometimes tend to settle on the grate and not pass down through it to provide proper packing density for acceptable liquid treatment. This is particularly true if the grate openings are made relatively small to provide maximum retention of the filter bed during the treatment cycle. Small grate openings also make it more difficult to disrupt the bed when it is time to start the wash cycle.

SUMMARY OF THE INVENTION

This invention overcomes the disadvantages resulting from the use of a grate by providing a vibrator to impart motion to the granular solids as they are settling. Instead of impeding settling, the motion imparted by the vibrator not only facilitates passage of the particles through the grate, but also results in a higher packing density of the granular solids under the grate. Thus, the vibrator reduces the settling time required for the granular solids, and results in a more compact static bed, which provides better treatment and longer treatment runs between washing cycles. The vibrator can also be used to loosen the bed at the beginning of the wash cycle, permitting the use of a grate with smaller openings, which permits a longer operating run because a higher pressure drop can be imposed across the filter bed without disrupting it.

In terms of liquid treating apparatus, this invention includes a housing and a bed of granular solids disposed within the housing in a normally static state during liquid treatment. An inlet in the housing supplies liquid to be treated in a lower portion of the bed, and an outlet in the housing permits removal of treated liquid after it has passed up through the bed. A grate extends across the housing interior in contact with the bed of solids in their static state, and means are provided for intermittently vibrating the granular solids so that after the washing operation the settling of the solids if expedited and improved to provide higher packing density than would be obtained without vibrating the solids.

In one presently preferred form of the invention, the grate is made up of horizontal parallel bars welded at their ends to the housing interior, and one or more mechanical vibrators are secured to the housing exterior at the level of the grate. One or more vibrators may be mounted directly to the grates within the bed of granular solids. Preferably, the vibrators are driven by compressed air. When the vibrators are used to break up the static bed for the washing cycle, the compressed air used to drive the vibrators is exhausted into the bed to assist in loosening and fluidizing it. During the settling cycle, the air from the vibrators is either exhausted outside the filter housing, or else vibrators which exhaust within the bed are shut down.

In terms of method, material is removed from a liquid by flowing the liquid up through a bed of granular solids which remove the material from the liquid. The bed of granular solids is held static with a grate in contact with the solids until the bed is loaded with material removed from the liquid. Thereafter, air or liquid, or both, is flowed up through the bed of granular solids at a rate sufficient to cause the bed to fluidize and expand above the grate, thereby releasing material previously removed from the liquid. Thereafter, the flow of liquid (or air, if used) up through the expanded bed is stopped or at least decreased to a rate which permits granular solids to settle. The solids are vibrated as they settle to facilitate their passage down through the grate, and to increase the packing density of the solids in the bed below the grate. Additional liquid is thereafter flowed up through the static bed to remove material from the additional liquid. Preferably, the bed of granular solids is also vibrated during the washing cycle to insure complete fluidization and expansion of the bed for uniform washing or removal of material previously trapped within the bed.

BRIEF DESCRIPTION OF THE DRAWINGS

The invention will be more fully understood from the following detailed description and the accompanying drawings, in which.

Figure 1:
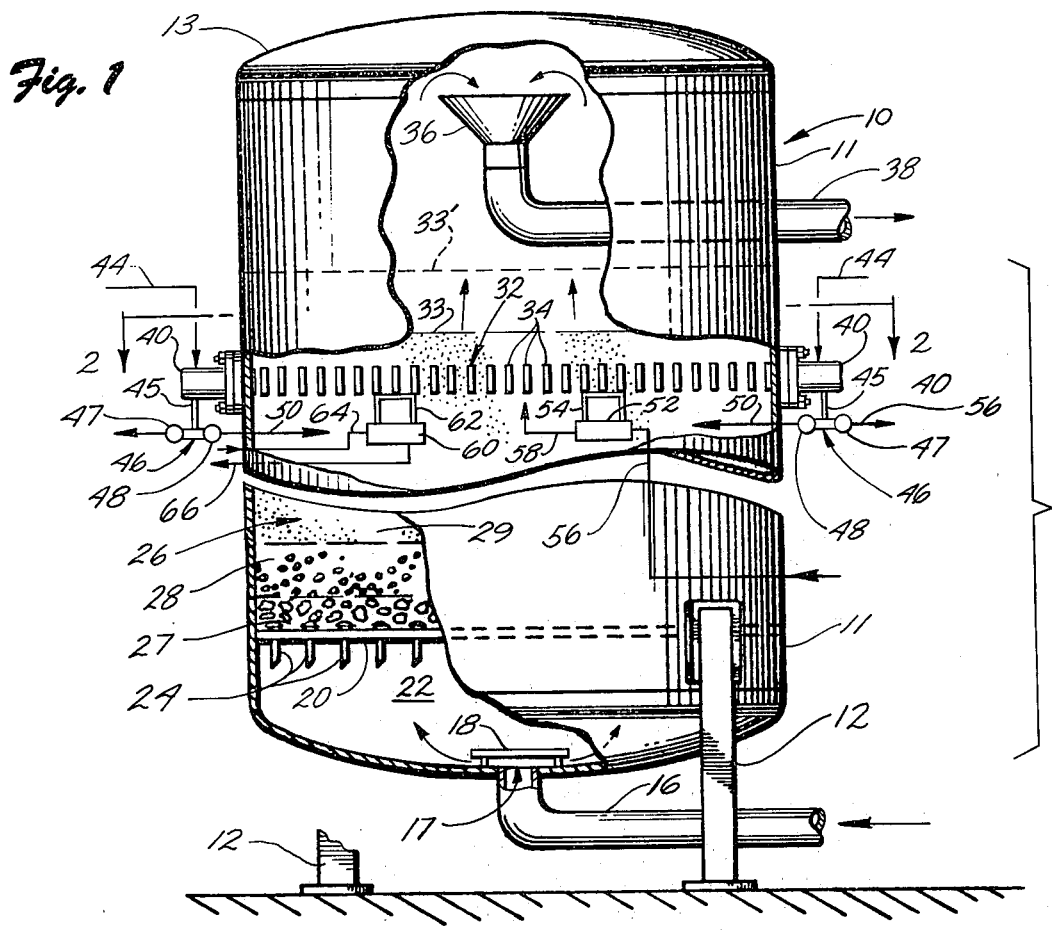
FIG. 1 is a schematic elevational fragmentary view, partly broken away, showing vibrators used in accordance with this invention.

Referring to the drawings, a typical upflow filter 10 includes an upright cylindrical tank or housing 11 supported above ground level by vertical legs 12. The upper end of the housing is closed by a dome-shaped top 13, and the lower end of the housing is closed by a dome-shaped bottom 14. An inlet pipe 16 is connected to an inlet port 17 in the center of the housing bottom. A circular baffle plate 18 is mounted over the inlet port to deflect the flow of liquid horizontally as it enters the filter housing.

A horizontal circular bed plate 20 is welded around its periphery to the interior of the filter housing. The bed plate is spaced above the bottom of the filter to provide a plenum chamber 22 for incoming liquid to be filtered. A plurality of vertical flow nozzles 24 are mounted through the bed plate to distribute incoming liquid uniformly across the bottom of a filter bed 26 of granular solids resting on the top surface of the bed plate. The filter bed includes a relatively thin layer 27 of coarse gravel, a slightly thicker intermediate layer 28 of smaller gravel or sand, and a relatively thick top layer 29 of finer sand grains. The filter bed can also be made up of ion exchange resin. The flow nozzles may be of any suitable design, but adjustable flow nozzles such as those disclosed in U.S. Pat. No. 2,498,462 are ideally suited for obtaining uniform distribution of incoming liquid across the bottom of a filter bed of normally static granular solids.

A horizontal circular grate 32 is mounted within the filter housing a relatively short distance below the top 33 of the upper layer 29 of the filter bed. The grate is made up of a plurality of parallel horizontal bars 34 welded at their ends to the interior of the filter housing. The size and spacing of the bars depend on the character of the filter bed and the liquid being filtered. In a typical upflow sand filter for water, the granulated solids in the filter bed have particle sizes in the range between about 0.3 mm. and about 3.0 mm. A typical bar in the grate is rectangular in transverse vertical section, with the larger dimension of the rectangle extending vertically. A typical bar is about ½ inch across, and about 3 inches high. The bars are set on 4½ inch centers.

Liquid flowing up from the top of the filter bed enters an upwardly diverging funnel 36 mounted on an outlet pipe 38, which extends out through the wall of the filter housing.

Four exterior mechanical vibrators 40 are secured to the exterior of the housing at the level of the grid and at equally spaced intervals, i.e., 90° apart.

Each vibrator is secured by nuts 41 secured to bolts 42 welded to a pad 43, which is welded to the exterior of the housing. The inner face of each pad has a concave surface to match the curvature of the cylindrical housing, and the vertical dimension of the pad spans the grid welded to the interior of the housing.

The vibrators are of the conventional air-driven type. Compressed air is supplied through an inlet hose 44 and exhausted through an outlet 45 to a T-connection 46, which permits exhaust air to be discharged through a first valve 47 into the atmosphere, or through a second valve 48 into an exhaust line 50, which enters the filter housing to discharge air into the filter bed under the grate.

For additional vibration, a first interior vibrator 52 is secured by a bracket 54 to the underside of the grate. Air is supplied to the first interior vibrator through an air supply hose 56 extending through the filter housing. Air from the first interior vibrator is discharged through an exhaust hose 58 into the filter bed under the grate.

A second interior vibrator 60 is secured by a bracket 62 to the underside of the grate. Air is supplied to the second interior vibrator through an air supply hose 64 extending through the filter housing. Air from the second inner vibrator is discharged through an exhaust hose 66 which extends from the vibrator out through the filter housing.

Figure 2:
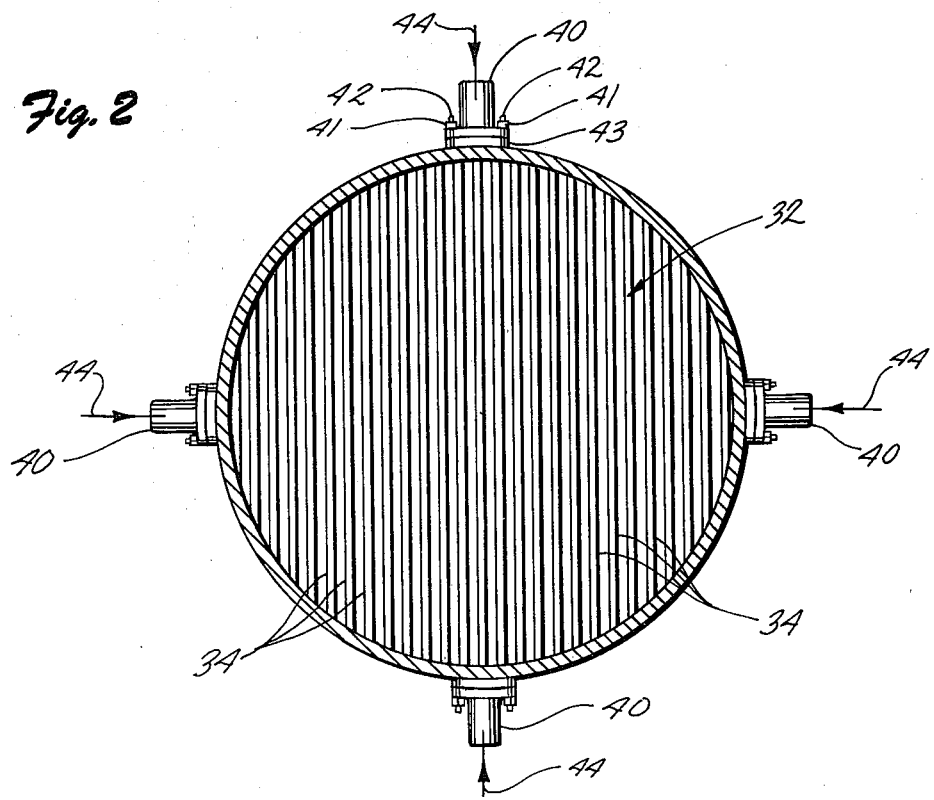
FIG. 2 is a view taken on line 2—2 of FIG. 1.

In using the filter shown in FIGS. 1 and 2 to remove material in a liquid, the liquid is pumped (by conventional means, not shown) through the inlet pipe and into the plenum chamber in the bottom of the filter housing. Incoming liquid is uniformly distributed by the upflow nozzles to the lower layer of coarse solids in the static filter bed. The largest of the particulate material to be removed from the liquid is trapped first, with the smaller particles being trapped as the liquid flows upwardly through ever decreasing capillaries in the filter bed. Clear effluent leaves the top of the filter bed and is removed through the discharge funnel and outlet pipe.

As the filter bed becomes loaded with material removed from the liquid, the pressure drop across the bed increases until it is no longer economical to continue the filtering operation. At this point, the discharge from the outlet pipe is diverted, if the effluent from the filter bed is a desired product of the filtration. Otherwise, diversion of the flow from the outlet pipe is not necessary. The flow of liquid up through the filter bed is then increased by increasing the pumping pressure, and compressed air is supplied to the vibrators so that they impart substantial motion to the granular solids in the filter bed. The valves 48 are opened and the valves 47 are closed so that air from the external vibrators is discharged into the filter bed, facilitating its disruption and fluidization. Air is also supplied to the interior vibrators if they are needed to dislodge the filter bed from its static condition. The vibration from the exterior vibrators is coupled to the bed through the pad, the housing, and the grate bars. The vibration from the interior vibrators is coupled to the bed through the mounting brackets and grate bars, and directly by contact of the bed solids with the vibrators. As the bed breaks up and expands, a substantial portion of the solids move up through the grate to level 33' shown in dotted line in FIG. 1. The upwardly flowing liquid flushes previously trapped material from the bed and filter housing. After the desired amount of the trapped material is removed, the upward flow of the liquid is decreased or stopped altogether, valves 48 are closed, and valves 47 are opened so that air from the exterior vibrators now does not enter the filter bed. The first interior vibrator is turned off to terminate the discharge of air into the filter bed from that vibrator. The granular solids are then allowed to settle, with the exterior vibrators and the second interior vibrator in operation. Under the effect of the motion imparted to the solids by the vibrator during the settling stage, the solids pass readily down through the grate and assume a relatively high packing density, that is, a packing density substantially higher than would result if the vibrators were not used. This provides a tightly packed bed under the grate in a relatively short time, thus reducing the down time required for the washing and settling cycle. Once the desired settling has occurred, the filter is ready for a second batch of liquid to be put through it with material to be removed as previously described.

The use of vibration during the settling cycle (and during the initiation of the washing cycle, if required) not only minimizes the down time of the equipment, but it also permits a higher throughput rate when the filter is in operation because of the tighter packing of the granular solids, which provides better filtration and longer filtering runs between washing and settling cycles. Moreover, the vibration during settling makes it possible to filter certain types of liquids which previously could not be treated in an upflow sand filter. For example, water solutions of extract from kelp is extremely viscous (often 20 to 40 times as viscous as water, even though heated to 160° F.), and before this invention could not be filtered in a conventional upflow sand filter.

When the apparatus of this invention is used as an ion exchanger, i.e., when granular ion exchange resin makes up the bed within the housing, the vibrators insure a firmly packed bed held snugly in place by the grate. This permits the regenerative solution to be passed through the bed at a relatively high flow rate, thereby minimizing the time required to regenerate the ion exchange resin bed.

I claim:

1. The method of removing material from a liquid comprising the steps of
   flowing liquid up through a bed of granular solids which remove the material from the liquid,
   holding the bed of granular solids static with a grate in contact with the solids until the solids are loaded with material removed from the liquid,
   flowing liquid up through the bed at rate sufficient to cause the bed to fluidize and expand above the grate, whereby at least a portion of the material loaded in the bed while it was static is removed,
   decreasing the flow of liquid up through the expanded bed to a rate which permits granular solids to settle,
   vibrating the grate and the solids as they settle to facilitate passage of solids down through the grate and increase the packing density of the solids in the bed below the grate, and
   thereafter flowing additional liquid up through the static bed to remove material from the additional liquid.

2. The method according to claim 1 which includes the step of vibrating the grate and bed of solids with a mechanical vibrator while flowing liquid up through the bed at a rate sufficient to cause the bed to fluidize.

3. The method according to claim 2 which includes using an air-driven vibrator to impart motion to grate and the solids when flowing liquid up through the bed at a rate sufficient to cause the bed to fluidize, and discharging air from the vibrator into the bed to assist in the fluidization of the bed.

* * * * *